Aug. 2, 1932.　　A. KINDELMANN　　1,869,852
APERTURE PLATE
Filed Feb. 1, 1930　　2 Sheets-Sheet 1

INVENTOR
Albert Kindelmann
BY
Howard W. Dix
ATTORNEY

Aug. 2, 1932.  A. KINDELMANN  1,869,852
APERTURE PLATE
Filed Feb. 1, 1930  2 Sheets-Sheet 2
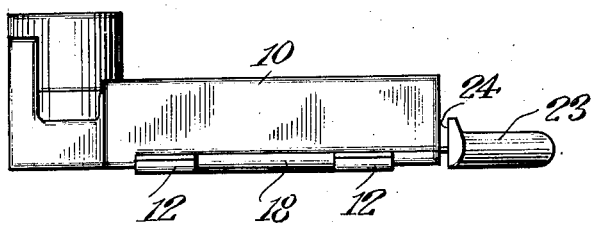
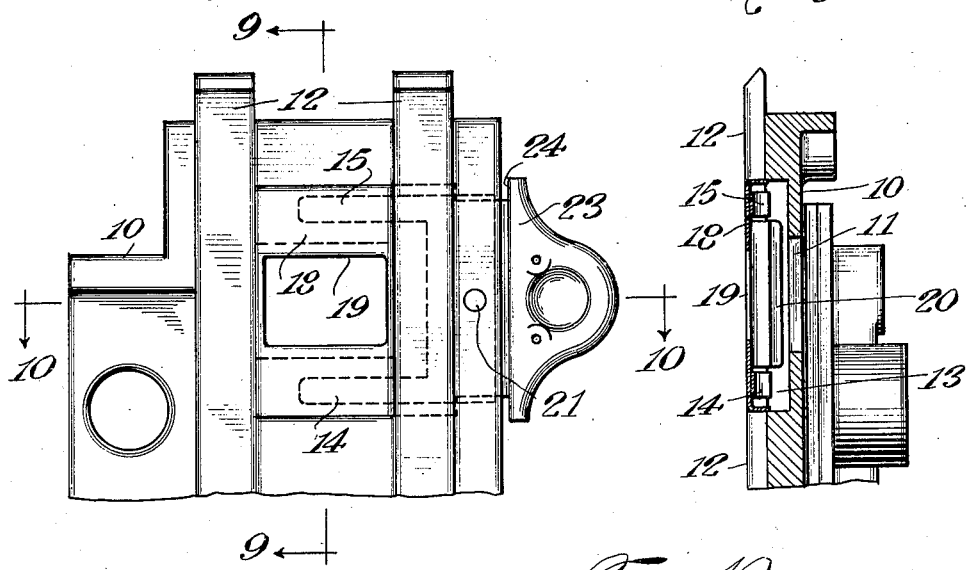
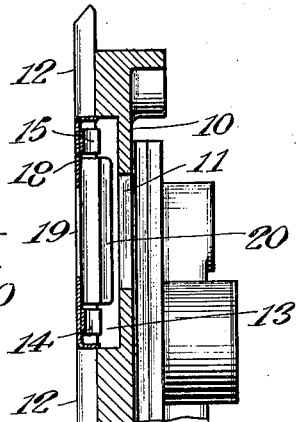
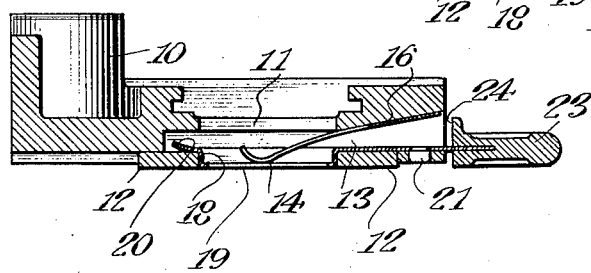
INVENTOR
Albert Kindelmann
BY
Howard W. Dix
ATTORNEY Patented Aug. 2, 1932

1,869,852

UNITED STATES PATENT OFFICE

ALBERT KINDELMANN, OF FLORAL PARK, NEW YORK, ASSIGNOR TO INTERNATIONAL PROJECTOR CORPORATION, OF NEW YORK, N. Y., A CORPORATION OF DELAWARE

APERTURE PLATE

Application filed February 1, 1930. Serial No. 425,175.

This invention relates to new and useful improvements in aperture plates for motion picture machines and has particular reference to improvements in aperture plates for use on projection machines in which more than one type of film is used, such as the speaking movie machines where the need for an adjustable or variable size of aperture is quite important.

The main object of the invention is to provide a simple, compact, efficient, and readily operable device whereby the aperture in a motion picture machine such as a projector of speaking-movies may be easily and quickly changed from a size suitable to the projection of a normal film to one suitable for the projection of the film which carries the usual striata employed in speaking-movie projection.

A further object is to provide a simple, compact, and efficient substitute plate which may be readily slipped into place in the machine to modify the machine to obtain proper projection of speaking-movies, and which is constructed to be automatically locked in place as it is slipped into operative position, but which with equal simplicity and ease may be removed from operative position in an instant of time and therefore without interrupting the operation of the machine to any appreciable extent.

Further and more specific objects, features, and advantages will more clearly appear from the detailed description given below when taken in connection with the accompanying drawings which form part of the specification and which illustrate one present preferred form of the invention.

In the general contemplation of the invention it is to be noted that it includes a gate plate somewhat of the usual type disposed on the projection head of the machine and preferably at right angles to the projection light beam and provided with an aperture therein of the usual and standard size for the projection of the normal film or of any other film for which the aperture above referred to is normal. This would mean that the aperture in the gate plate might even be of the large size now being introduced in theatres where the width of the film is much larger than ordinarily so that the picture on the screen generally covers the entire stage space and permits the inclusion in pictures of much more background.

In order that this ordinary normal aperture may be modified so that another film may be passed through the same machine, it has been contemplated to employ a substitute aperture plate which may be readily slipped into a suitable opening or slot in the standard gate plate and preferably from the side thereof. This substitute plate is provided with a portion which may be called a seat portion which is an offset portion adapted to be seated automatically as the substitute plate is slipped into place in a corresponding recess or seat portion of the gate plate. Suitable means such as a spring is employed to snap the seat portion of the substitute plate into the recess in the gate plate as soon as it reaches proper assembled position to thereby hold it in the operative position as long as it remains therein. When it is desired to withdraw the substitute plate, it is merely necessary to grasp it in the hand and give it a slight sidewise movement to push back the retaining spring whereupon the plate may be drawn out of the slot leaving the normal aperture across the projection light beam. The invention furthermore contemplates the provision of a simple and durable latch element which in company with the holding spring above mentioned will tend to keep the substitute aperture plate above mentioned firmly in position at all times until released.

The present preferred form of the invention is illustrated in the drawings in which, Fig. 1 is a plan view of the standard gate plate;

Fig. 7 is a plan view of the gate plate with the substitute plate in place;

Fig. 8 is a front elevation of the same;
Fig. 9 is a cross section on the line 9—9 of Fig. 8;
Fig. 10 is a cross section on the line 10—10 of Fig. 8 showing the substitute plate partly inserted; and,
Fig. 11 is a similar view showing the substitute plate in fully operative position.

Figure 1:
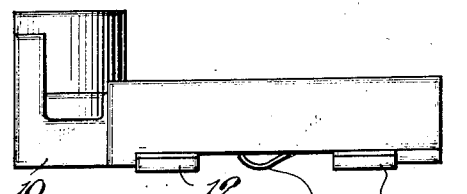
Figure 2:
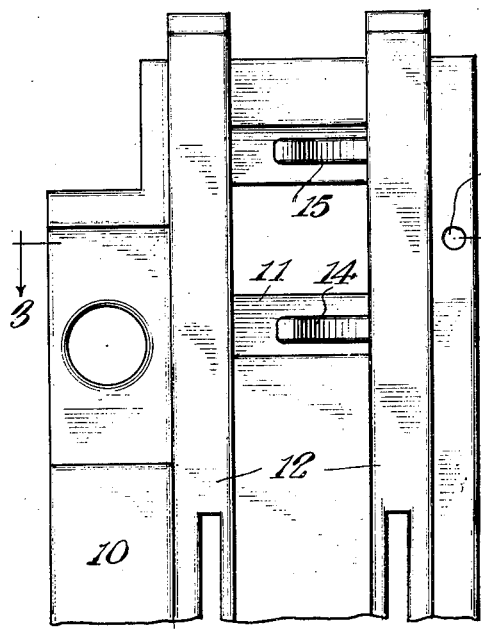
Fig. 2 is a front elevation thereof.
Figure 4:
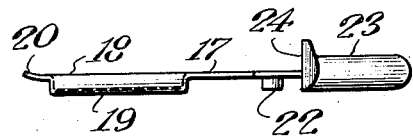
Fig. 4 is a plan view of the substitute plate.
Figure 5:
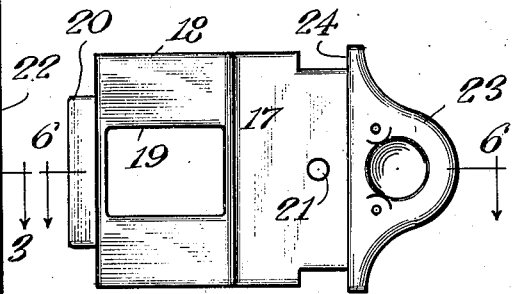
Fig. 5 is a front elevation of the substitute aperture plate.
Figure 3:
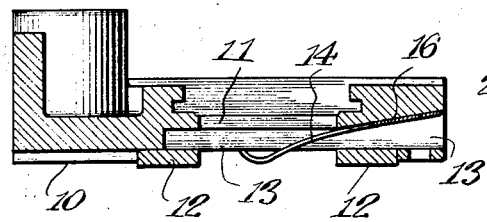
Fig. 3 is a cross section on the line 3—3 of Fig. 2.
Figure 6:
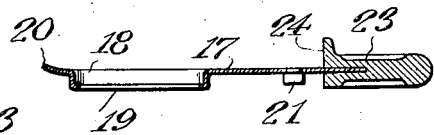
Fig. 6 is a cross section through the substitute plate on the line 6—6 of Fig. 5.

As shown in the drawings, the invention includes a gate plate such as 10 which may and preferably is the frame which includes a normal full-size aperture such as 11 for the projection of normal or standard sized or large sized films but without sound striata along one edge. This gate plate has the usual strips along one face and spaced apart to provide smooth surfaces along which the film may move. The gate plate 10 is provided with a lateral slot 13 which extends thereinto from the side a distance at least slightly greater than the width of the normal aperture 11. This slot has a height at least slightly larger than the height of the normal aperture. In this slot above and below the aperture 11 in the gate plate 10 there are disposed a pair of springs such as 14 and 15 which extend horizontally with their free ends disposed preferably just above and below the center of the aperture 11. These free ends are preferably curved and flared outwardly slightly and the other ends of the springs 14 and 15 are fixed against a back sloping wall 16 of the slot near the open end thereof. This slope is such as to naturally give the free ends of the springs a forward slant as seen in Fig. 3 which will cause them to project slightly into the line of the slot 13 as shown unless pushed and held back therefrom.

This slot 13 is provided for the very evident purpose of receiving an auxiliary plate having therein a substitute aperture modified in any desired manner so as to have dimensions to permit the projection of the speaking-talking-movie film sections in which the area covered by the actual picture is slightly less in width in this instance, and generally more than the normal film. The remainder of the film is taken up by striata which reproduce the sound in a well known manner. It is necessary to cover up this narrow side edge of the speaking-movie film so that the images of the sound striata will not be projected to the screen. This is the reason that the modified aperture is narrower generally along one side than the normal aperture. To this end the auxiliary plate such as 17 is provided and has thereon an offset portion such as 18 with an aperture 19 the size of which is proper for the projection of the above mentioned speaking-movies. The end of this plate 17 has a flat lip 20 slightly flared at its end to rest on the face of the slot just beyond the opening between the strips 12 as shown in Fig. 11. This plate is also provided with a pin or projection 21 adapted to project into a hole 22 in the gate plate 10 when the substitute plate 17 is in operative position. The plate 17 is also provided with an enlarged handle portion 23, which has a shoulder 24 to act as a stop against the side of the gate plate 10 to limit the inward movement of the plate 17.

A consideration of the drawings and the construction therein shown and above described will make it evident that when the films normal to this machine are being projected, the substitute plate 17 is not necessary and is therefore not located in the slot 13 but that when it is desired to project such pictures as the speaking-movies which are not normal to the usual machine, then it becomes necessary to modify the aperture and this is quickly and easily affected by slipping the plate 17 into the lateral slot 13. Upon first inserting the plate 17 into the slot 13 the tendency of the springs 14 and 15 is to cause it to assume the position shown in Fig. 10 but when the plate 17 is pushed against the springs to its full operative position shown in Fig. 11 then the springs will cause the offset portion of the plate 17 to be forced into the seat portion between the strips 12 of the gate plate 10 and will tend to hold it in this position. Furthermore the pin 21 will then project into the hole 22 and the plate 17 will thus be prevented from accidently sliding out of the slot 13. When the plate 17 is in its operative position it will be noticed that the aperture 19 therein is practically flush with the surface of the strips 12 with which the film contacts and is therefore right close to the film and assists in preventing buckling of the film as it passes in front of the aperture.

To remove the substitute plate 17 from its operative position it is merely necessary to slide it to one side as shown in Fig. 10 which sidewise movement will withdraw the pin 21 from the hole 22 and permit the substitute plate 17 being slid out of the slot 13 thus leaving the aperture 11 exposed for projection of film normal in size to the machine.

The insertion and withdrawal of this substitute plate 17 takes but a few seconds time and yet when it is inserted, it is held firmly, accurately, and securely in position so that the ordinary operation of the machine will not dislodge it and a positive movement and manipulation of the handle 23 is required to release it.

Thus there is furnished a simple, compact, durable, and efficient device whereby the aperture of the machine may be easily and quickly modified to permit the projection of the modified films for the projection of the speaking-movies or for other purposes. The invention involves the provision of a gate plate with a receiving seat portion or recess and a substitute plate with an offset seat portion to be received in the seat portion of the gate plate with means such as the springs to hold the offset portion in its seat and means such as the pin and hole arrangement to prevent the substitute plate from sliding out of position until positively released.

While the invention has been described in detail and with particular reference to the present preferred form thereof, it is not to be limited to such details and forms since many changes and modifications may be made and the invention embodied in other forms and modifications without departing from the spirit and scope of the invention in its broadest aspects. Hence it is desired to cover any and all forms and modifications which may come within the language or scope of any one or more of the appended claims.

What is claimed, is,

1. In combination, a gate plate having a lateral slot therein, and a seat receiving recess in said slot, and an aperture plate receivable in said slot, said aperture plate having an offset seat portion receivable in the recess in said slot, said aperture plate having an aperture in the off-set seat portion.

2. A substitute aperture plate for motion picture machines which comprises a plate, an offset seat portion thereon, said offset portion having an aperture therein, the end of said plate having a flared lip, the other end of said plate having an operating handle, and a lock pin projecting from the plate adjacent the handle.

3. In combination with a gate plate having an aperture therein as well as a lateral slot and a seat receiving recess in line with said aperture, a free substitute aperture plate slidable into said slot, said free plate having an offset seat portion with a modified aperture therein, said offset portion receivable in the recess in said gate plate, means on the gate plate to engage the substitute plate to hold it in said recess and means on the gate plate and the substitute plate to engage and hold the substitute plate from sliding out of said slot.

4. In combination with a gate plate having an aperture and a lateral slot and a seat receiving recess therein, a substitute aperture plate receivable in said slot, an offset seat portion on said substitute aperture plate, said substitute aperture plate having an aperture in the offset seat portion, said offset portion receivable in the recess in said gate plate, means on the gate plate to press against the substitute plate to hold the offset portion in said recess.

5. In combination with a gate plate having an aperture and a lateral slot and a seat receiving recess therein, a substitute aperture plate receivable in said slot, an offset seat portion on said substitute aperture plate, said substitute aperture plate having an aperture in the offset seat portion, said offset portion receivable in the recess in said gate plate, means on the gate plate to press against the substitute plate to hold the offset portion in said recess, and means on the gate plate interlocking with means on the substitute plate to hold the substitute plate from sliding out of the slot therein until released.

6. In combination with a gate plate having an aperture and a lateral slot and seat receiving portion or recess therein, a substitute aperture plate receivable in said slot, an offset seat portion on said substitute aperture plate, said substitute aperture plate having an aperture in the offset seat portion, said offset portion receivable in the recess in said gate plate, springs on the gate plate to press against the substitute plate to hold the offset portion in said recess, a projecting pin on the substitute plate projecting into a hole on the gate plate when the substitute plate is in operative position to hold the substitute plate from sliding out of the slot in the gate plate until positively released.

7. A substitute aperture plate for motion picture machines which comprises a plate, an offset seat portion thereon, said offset portion having an aperture therein, one end of said plate having a flared lip, the other end of said plate having an operating handle with a stop shoulder thereon, and a lock pin projecting from the plate adjacent the handle.

8. In combination with a gate-plate having a normal lateral slot and an aperture therein, a substitute aperture plate insertable into said slot to align its aperture with the aperture in the gate-plate, spring means on the gate-plate and engaging the substitute plate for holding said substitute plate in its operative aligned position, and a cooperating pin and hole on the gate-plate and the aperture plate for keeping the substitute plate from sliding out of the slot.

9. In combination with a gate plate having an aperture and a lateral slot therein, said aperture to act as a seat, a substitute aperture plate insertable in said slot, an apertured off-set portion on said substitute plate and adapted to be received in said seat, and a spring on the gate plate pressing against this substitute plate to hold it in position in its seat.

ALBERT KINDELMANN.